United States Patent
Brunell et al.

(10) Patent No.: US 9,421,454 B2
(45) Date of Patent: *Aug. 23, 2016

(54) PROMOTIONAL CONTENT COORDINATION IN WAGERING GAME MACHINES

(71) Applicant: Bally Gaming, Inc., Las Vegas, NV (US)

(72) Inventors: Edward G. Brunell, Chicago, IL (US); Mark B. Gagner, West Chicago, IL (US); Timothy T. Gronkowski, Chicago, IL (US); Scott A. Massing, Lincolnwood, IL (US); Charles A. Richards, Buffalo Grove, IL (US); Craig J. Sylla, Round Lake, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,380

(22) Filed: Apr. 21, 2015

(65) Prior Publication Data

US 2015/0228157 A1 Aug. 13, 2015

Related U.S. Application Data

(63) Continuation of application No. 13/289,575, filed on Nov. 4, 2011, now Pat. No. 9,126,106.

(60) Provisional application No. 61/410,750, filed on Nov. 5, 2010.

(51) Int. Cl.
*A63F 13/00* (2014.01)
*G07F 17/32* (2006.01)

(52) U.S. Cl.
CPC ........... *A63F 13/00* (2013.01); *G07F 17/3216* (2013.01); *G07F 17/3255* (2013.01)

(58) Field of Classification Search
CPC .. G07F 17/32; G07F 17/3223; G06Q 10/087
USPC ............... 463/20, 42, 16, 25, 43; 705/14.38
See application file for complete search history.

(56) References Cited

U.S. PATENT DOCUMENTS

| 7,025,674 B2 | 4/2006 | Adams et al. |
| 7,744,456 B2 | 6/2010 | Walther et al. |

(Continued)

FOREIGN PATENT DOCUMENTS

| WO | WO2005017706 | 2/2005 |
| WO | WO2007033068 | 3/2007 |

(Continued)

OTHER PUBLICATIONS

U.S. Appl. No. 13/289,575 Final Office Action, Aug. 7, 2013, 18 Pages.

(Continued)

*Primary Examiner* — Masud Ahmed
(74) *Attorney, Agent, or Firm* — DeLizio Law, PLLC

(57) ABSTRACT

A wagering game system and its operations are described herein. In some embodiments, the operations can include monitoring gaming-related events at a wagering game machine of the wagering game system to detect a promotion trigger event. The operations can also include determining information associated with the promotion trigger event, and providing the information associated with the promotion trigger event to a promotional content server of the wagering game system to cause the promotional content server to select promotional content based, at least in part, on the information associated with the promotion trigger event. The operations can further include receiving the promotional content from promotional content server in response to said providing the information associated with the promotion trigger event to the promotional content server, and presenting the promotional content at the wagering game machine.

20 Claims, 7 Drawing Sheets

(56) References Cited

U.S. PATENT DOCUMENTS

| | | | |
|---|---|---|---|
| 7,862,430 B2 | 1/2011 | Baerlocher et al. | |
| 7,993,199 B2 | 8/2011 | Iddings et al. | |
| 8,012,009 B2 | 9/2011 | Iddings et al. | |
| 8,016,660 B2 | 9/2011 | Walther et al. | |
| 8,029,364 B2* | 10/2011 | Loose et al. | 463/42 |
| 2004/0162144 A1* | 8/2004 | Loose et al. | 463/42 |
| 2004/0198487 A1* | 10/2004 | Schneider | 463/20 |
| 2006/0122881 A1* | 6/2006 | Walker et al. | 705/14 |
| 2006/0148551 A1 | 7/2006 | Walker et al. | |
| 2007/0004519 A1 | 1/2007 | Swart et al. | |
| 2007/0060303 A1* | 3/2007 | Govender et al. | 463/25 |
| 2007/0117623 A1* | 5/2007 | Nelson et al. | 463/29 |
| 2008/0167106 A1* | 7/2008 | Lutnick et al. | 463/16 |
| 2009/0099239 A1 | 4/2009 | Ewart et al. | |
| 2009/0124351 A1* | 5/2009 | DeWaal et al. | 463/25 |
| 2009/0299848 A1 | 12/2009 | Cao et al. | |
| 2010/0255899 A1 | 10/2010 | Paulsen | |
| 2011/0223993 A1 | 9/2011 | Allen et al. | |

FOREIGN PATENT DOCUMENTS

| | | |
|---|---|---|
| WO | WO2007076238 | 7/2007 |
| WO | WO2008024556 | 2/2008 |
| WO | WO2010114764 | 10/2010 |

OTHER PUBLICATIONS

U.S. Appl. No. 13/289,575 Office Action, Jan. 24, 2013, 19 pages.

"U.S. Appl. No. 13/289,575 Office Action", Sep. 15, 2014, 22 Pages.

Co-pending U.S. Appl. No. 13/289,575, filed Nov. 4, 2011, 50 pages.

* cited by examiner

PROMOTIONAL CONTENT COORDINATION IN WAGERING GAME MACHINES

RELATED APPLICATIONS

This application is a Continuation of and claims priority benefit of U.S. application Ser. No. 13/289,575 filed Nov. 4, 2011, which claims the priority benefit of U.S. Provisional Application Ser. No. 61/410,750 filed Nov. 5, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, WMS Gaming, Inc.

FIELD

Embodiments of the inventive subject matter relate generally to wagering game systems, and more particularly to coordination of promotional content presentations in wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments are illustrated in the Figures of the accompanying drawings in which.

DESCRIPTION OF THE EMBODIMENTS

Figure 1:
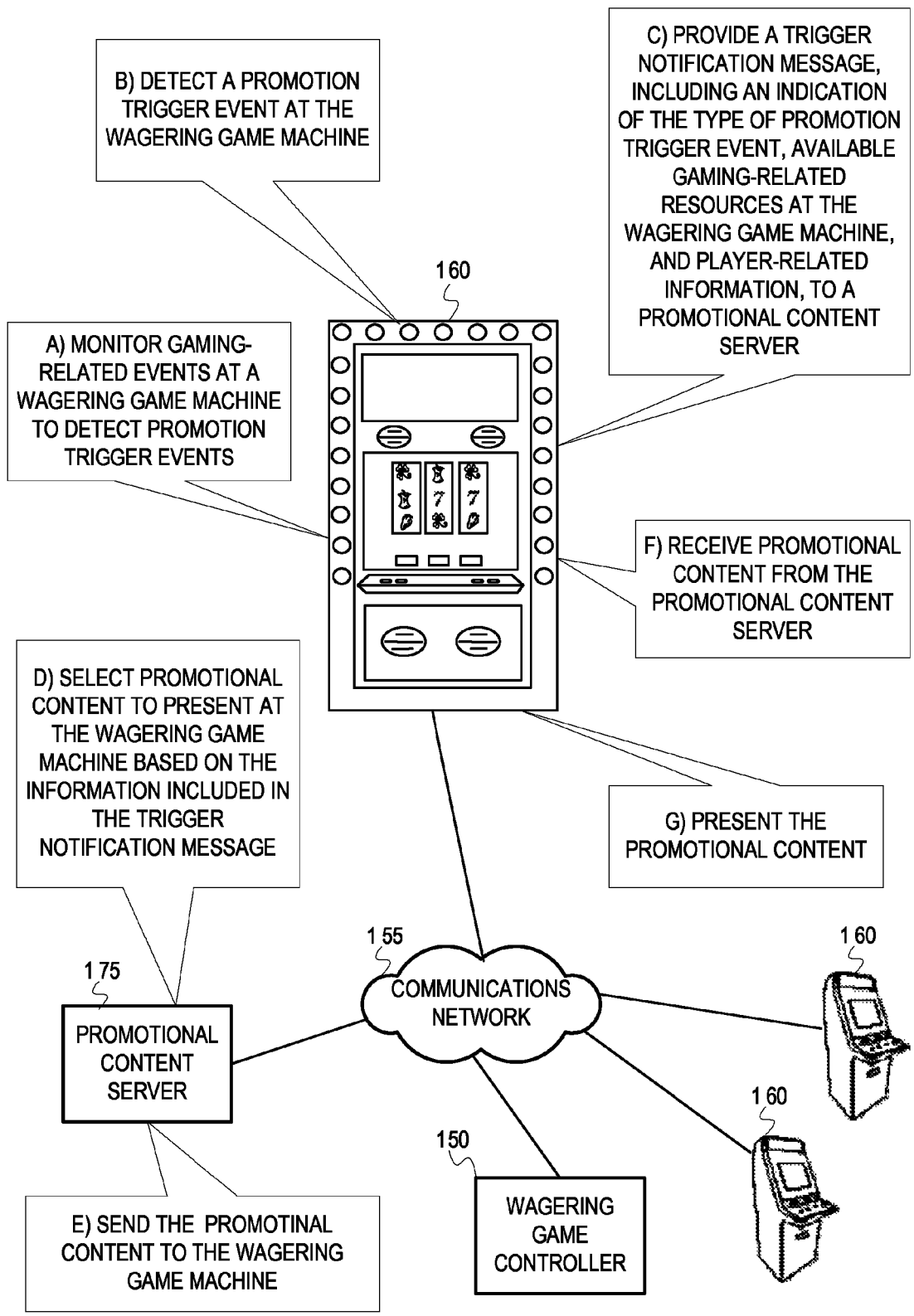
FIG. 1 is a conceptual diagram illustrating an example mechanism for coordinating and customizing presentations of promotional content in wagering game machines of a wagering game system, according to some embodiments.

This description of the embodiments is divided into five sections. The first section provides an introduction to some embodiments, while the second section describes example wagering game machine architectures. The third section describes example operations performed by some embodiments and the fourth section describes example wagering game machines in more detail. The fifth section presents some general comments.

INTRODUCTION

This section provides an introduction to some embodiments.

Operators of wagering game systems ("system operators"), such as casino operators, can configure the system to present promotional content in dedicated digital signage located across the system. For example, in a casino (and other gaming establishments), promotional content (e.g., advertisements, special offers, special events, giveaways, etc.) can be presented in overhead LCD screens, plasma screens, LED screens and other dedicated digital signage located across the casino floor. In some embodiments, in addition to the dedicated signage, system operators can implement a mechanism in wagering game systems for coordinating and customizing the presentation of promotional content in the wagering game machines of the wagering game systems. Each of the wagering game machines of a wagering game system can monitor gaming-related events in the wagering game machine to detect gaming-related events that can trigger a presentation of promotional content in the wagering game machine ("promotion trigger events"). Promotion trigger events can be predefined gaming-related events that can be detected in the wagering game machine that can indicate opportunities to present promotional content at the wagering game machine. For example, promotion trigger events may include player login/logout, an idle machine, an idle period of time between rounds of a wagering game, big wins/losses, a player accessing other services/amenities offered at wagering game machine (e.g., game information, chat, Internet, virtual gaming community, etc.), presentation of predefined game content (e.g., bonus games, game results, etc.), and other predefined (and configurable) gaming-related events. In some implementations, if a wagering game player ("player") is logged in to the wagering game machine, the wagering game machine can also determine player-related information (e.g., player demographics, player gaming activity, etc.) associated with the player account of the player. The wagering game machine can then send a trigger notification message to a promotional content server of the wagering game system to indicate that promotional content can be presented at this time based on the occurrence of the promotion trigger event (i.e., coordinate the presentation of the promotional content). The trigger notification message may include an indication of the type of promotion trigger event, and in some cases, also include an indication of the resources available at the wagering game machine and the player-related information associated with the corresponding player account, as will be further described below with reference to FIGS. 1-5. The promotional content server can select the promotional content to present at the wagering game machine based on the information included in the trigger notification message to customize the presentation of the promotional content. Coordinating the timing the presentation of the promotional content at the wagering game machine based on the promotion trigger events can prevent interruption of wagering games that are played at the wagering game machine, can prevent distracting and/or disrupting players while they play wagering games, and can prevent violations of gaming laws and regulations. Customizing the presentation of the promotional content at the wagering game machine based on the information included in the trigger event notification can help ensure the promotional content that is presented is relevant to the player and/or trigger event, and can also help ensure that the presentation is customized according to the resources available at the wagering game machine. Furthermore, customizing the promotional content can also increase the market value associated with the promotional content offerings, and therefore may provide additional revenue to the system operator and additional value to the operator's promotional partners.

FIG. 1 is a conceptual diagram illustrating an example mechanism for coordinating and customizing presentations of promotional content in wagering game machines of a wagering game system, according to some embodiments. In the example shown in FIG. 1, the wagering game system 100 includes a wagering game controller 150 and a promotional content server 175 connected to a plurality of wagering game machines 160 via a communications network 155 (e.g., a wired and wireless local area network (LAN)).

In one implementation, at stage A, the wagering game machine 160 monitors gaming-related events at the wagering game machine 160 to detect promotion trigger events. In some examples, gaming-related events can include all gaming activity, machine activity, and player activity associated with the wagering game machine 160, and promotion trigger events may be a subset of the gaming-related activity that are predefined as promotion trigger event to indicate opportunities to present promotional content at the wagering game machine. In some examples, the promotion trigger events can be predefined within the wagering game system 100 by the system operator, gaming-related partners (e.g., game manufacturers), and/or promotional content partners (e.g., third party promotional content provider/manager). Promotion trigger events may include player login/logout, an idle machine status, an idle period of time between rounds of a wagering game, big wins/losses, a player accessing other services/amenities offered at wagering game machine (e.g., game information, chat, Internet, virtual gaming community, etc.), presentation of predefined game content (e.g., bonus games, game results, etc.), and other predefined gaming-related events.

At stage B, the wagering game machine 160 detects a promotion trigger event at the wagering game machine 160. For example, the wagering game machine 160 can detect a player logout request after a big win (e.g., a win that exceeds a predefined threshold amount) or a big low (e.g., a loss that exceeds a predefined threshold amount).

At stage C, the wagering game machine 160 provides a trigger notification message to the promotional content server 175. The trigger notification message includes an indication of the type of promotion trigger event that was detected, and also may include an indication of the gaming-related resources that are available at the wagering game machine 160 and/or player-related information (if a player is logged in). The indication (e.g., one or more bits, text, etc.) of the type of promotion trigger event may indicate which one or more of the predefined promotion trigger events was detected at the wagering game machine 160 (e.g., player login/logout, an idle machine status, an idle period of time between rounds of a wagering game, big wins/losses, etc.). In some implementations, the wagering game machine 160 can also include a time stamp as part of the indication of the type of promotional trigger event to also indicate at what time of the day the promotional trigger event occurred (and also the date and day of the week). The indication of the gaming-related resources that are available at the wagering game machine 160 may indicate the gaming-related resources of the wagering game machine 160 that can be used for presenting promotional content. For example, the gaming-related resources may include the number of displays that are available for presenting promotional content (e.g., main and top displays), the type of hardware/software that is available for presenting promotional content (e.g., touchscreen displays, web browsers with Adobe® Flash® capabilities, 3D displays, etc.), the lighting options available for promotional content, the audio options available for promotional content, and other interactive input devices available for promotional content (e.g., interactive chair, camera with machine vision, etc.). The player-related information can include player demographic data or player gaming activity data associated with the player account of the player that is logged in at the wagering game machine 160. For example, the player demographic data can indicate the gender and approximate age of the player. The player gaming activity data can indicate player gaming activity associated with the current wagering game session, such as the type(s) of game(s) currently being played (e.g., slots, video poker, etc.), theme(s) of the games currently being played (e.g., movie theme, wild west theme, space theme, etc.), total amount wagered, total amount won/lost, total number of games played, the number of max bets, and other indicators of the player's participation, performance, and/or achievements. The player activity data can also indicate historically player activity data associated with the player account of the player that is logged in. The historical player activity data can indicate information about the player activity since the account was opened, such as the type(s) of games played (e.g., slots, video poker, etc.), theme(s) of the games played (e.g., movie theme, wild west theme, space theme, etc.), total amount wagered, total amount won/lost, highest won amount, total number of games played, the number of max bets, how frequent the player visits the gaming establishment, and other indicators of the player's historical participation, performance, and/or achievements. It is noted, however, that in some implementations the trigger notification message may only include the indication of the type of promotion trigger event. Furthermore, in other implementations the trigger notification message may include additional information regarding the wagering games, machine, casino, and/or player. For example, the trigger notification message can indicate that the casino is hosting a special event on that day (e.g., a poker tournament, a convention, etc.), can indicate that the player has booked a room for a week in the casino hotel, can indicate player preferences that the player has indicated during the wagering game session or stored in the player account, etc.

At stage D, the promotional content server 175 can select the promotional content to present at the wagering game machine 160 based on the information included in the trigger notification message. In some embodiments, the promotional content server 175 may identify and select promotional content that may be relevant to the player and/or detected trigger event from a plurality of available promotional content based on the information included in the trigger notification message. For example, the trigger notification message can indicate an idle time period in between rounds of a wagering game with a movie theme, can indicate the player has been playing the game for two hours, can indicate that historically the player prefers games with movie or television show themes, and can indicate that the wagering game machine 160 has touchscreen and 3D display capabilities in the main display. Based on this information, the promotional content server 175 can select media of an advertisement for a movie that has recently been released to theaters (e.g., a movie preview in 3D, if available). In one example, the advertisement can also include an embedded link to a website where the player can buy tickets to the movie at any point during or after the media presentation of the advertisement. In another example, the trigger notification message can indicate a player logout with a loss of $250 during the wagering game session, indicate that the player has visited the casino at least once a year for the last 8 years, indicate that the player has attended a show offered in the casino each visit, and indicate that the wagering game machine 160 has touchscreen capabilities in the main display. Based on this information, the promotional content server 175 can determine that two theater shows that day are only 20-30% booked, and therefore can select a promotional media presentation that offers the player two free show tickets to one of the two available shows (e.g., with a face value of $200). For example, the promotional presentation can display information about the two shows and allow the player to select one of the two shows via the touchscreen to obtain the two free show tickets (e.g., either e-tickets or print tickets).

At block E, the promotional content server 175 sends the promotional content to the wagering game machine 160. For example, the promotional content server 175 can send media files (e.g., audio/video files) and other information necessary to present the promotional content at the wagering game machine 160.

At block F, the wagering game machine 160 receives the promotional content from the promotional content server 175 via the communications network 155.

At block G, the wagering game machine 160 presents the promotional content in one or more displays of the wagering game machine 160. In some implementations, the wagering game machine 160 can present the promotional content immediately after reception. In one example, the wagering game machine 160 can determine whether the promotion trigger event condition still exists after reception. If the promotional trigger event condition still exists after reception, the wagering game machine 160 presents the promotional content. Otherwise, the wagering game machine 160 can temporarily store (e.g., cache) and delay the presentation of the promotional content until the next promotional opportunity.

In some implementations, when the wagering game machine 160 sends the trigger notification message after detecting a player login, the promotional content server 175 can select one or more media presentations of promotional content based on the information included within the trigger notification message, and the wagering game machine 160 can receive and temporarily store (e.g., cache) the one or more media presentations of promotional content. The wagering game machine 160 can be configured to store and therefore delay presenting the promotional content, because presenting promotional content after player login may disrupt (or delay) game play and potentially disturb the player. After storing the promotional content, the wagering game machine 160 may continue to monitor gaming-related activity to detect subsequent promotion trigger events. In one implementation, in response to detecting a subsequent promotional trigger event, the wagering game machine 160 can present the promotional content that was temporarily stored. If more than one media presentation of promotional content was temporarily stored, the wagering game machine 160 can select at least a subset of the media presentations and present the subset of the media presentations (or all the media presentations). Since the promotional content is already stored in the wagering game machine 160, the promotional content can be presented at the wagering game machine 160 immediately after detecting the subsequent promotion trigger event. In another implementation, in response to detecting the subsequent promotion trigger event, the wagering game machine 160 can still send a trigger notification message to the promotional content server 175, and the promotional content server 175 can send a response message indicating which one or more of the stored media presentations to present (e.g., based on the type of subsequent promotion trigger event).

Although FIG. 1 describes some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 2:
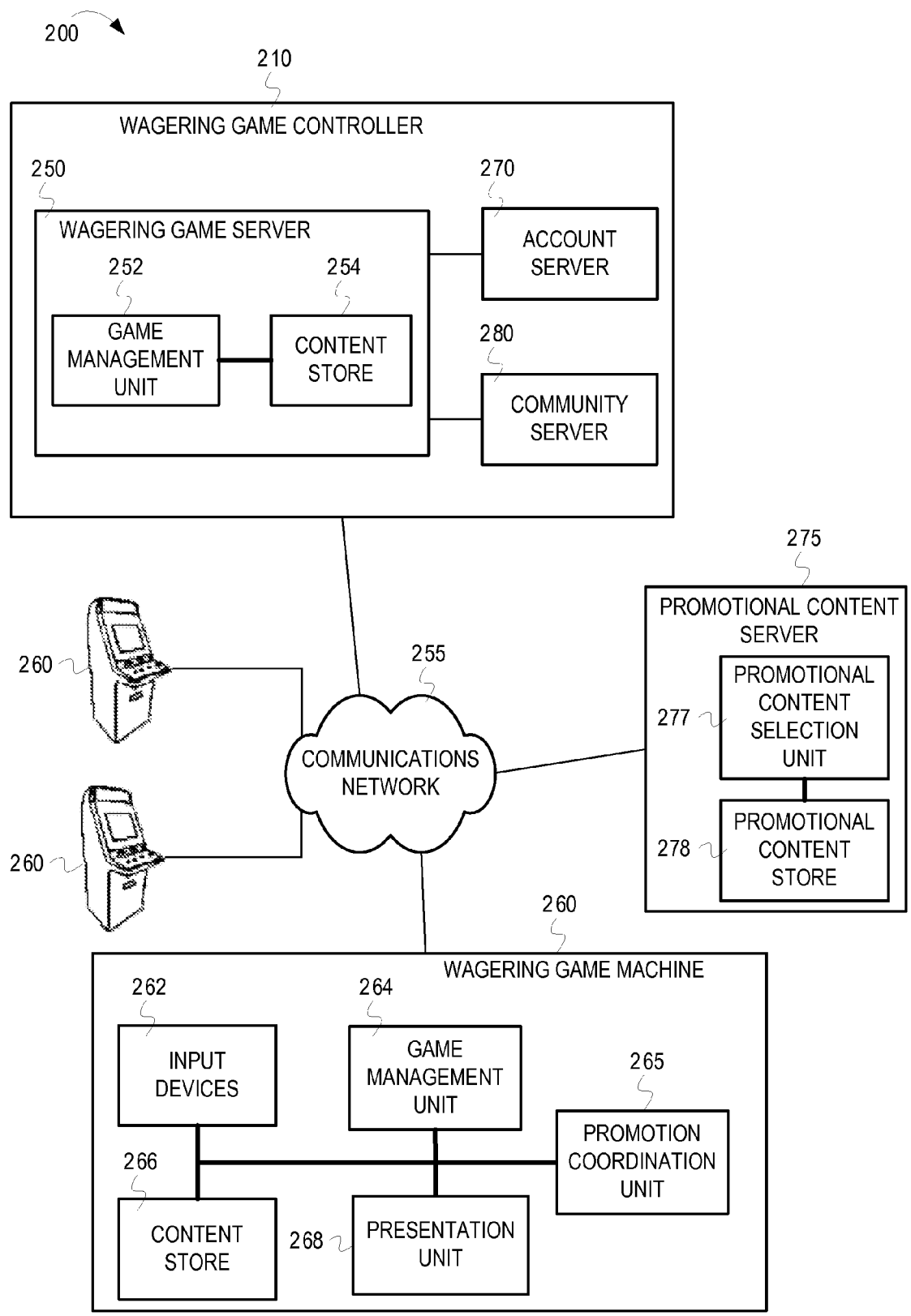
FIG. 2 is a conceptual diagram that illustrates an example of a wagering game system architecture, according to some embodiments.

FIG. 2 is a conceptual diagram that illustrates an example of a wagering game system architecture 200, according to some embodiments. As illustrated, the wagering game system architecture 200 includes a wagering game controller 210, a promotional content server 275, and a plurality of wagering game machines 260. The wagering game controller 210 is configured to control game content (e.g., game elements, game updates, game results, secondary game content, etc.) and communicate game-related information (e.g., player account information, game chat, virtual gaming community services, casino services, etc.) to and from the plurality of wagering game machines 260. In one example, the wagering game controller 210 includes a wagering game server 250, an account server 270, and a community server 280. The wagering game controller 210 may also be configured to communicate with other systems, devices, and networks (e.g., other physical casino networks and/or online casino systems).

The wagering game server 250 is configured to manage and control content for games presented on the wagering game machines 260. In some embodiments, the wagering game server 250 includes a game management unit 252 configured to manage game content and provide (e.g., stream) game content (e.g., secondary game content, game updates, etc.) and other game-related information to the wagering game machines 260. The game management unit 252 can be configured to generate (e.g., using a random numbers generator) game results (e.g., win/loss values), including win amounts, for wagering games played on the wagering game machines 260. The game management unit 252 can communicate the game results to the wagering game machines 260 via the network 255. In some embodiments, the game management unit 252 can generate random numbers and provide them to the wagering game machines 260 so that the wagering game machines 260 can generate game results. It is noted, however, that in some embodiments the wagering game machines 260 can locally generate random numbers to determine game results. The wagering game server 250 can also include a content store 254 configured to store game content (e.g., base games content, backups, updates, secondary bonus game content, etc.) and other game-related information associated with games presented on the wagering game machines 260.

The account server 270 is configured to manage player-related accounts associated with the wagering game system 200. The account server 270 can manage player financial accounts (e.g., performing funds transfers, deposits, withdrawals, etc.) and player information (e.g., account identification numbers, player activity information, financial information, screen name, social contacts, etc.). The account server 270 can also provide auditing capabilities, according to regulatory rules, and track the performance of players, machines, and servers. The account server 270 can include an account controller configured to manage information for player wagering game system accounts. The account server 270 can also include an account store configured to store information for player wagering game system accounts (e.g., player account information, player activity information, etc).

The community server 280 is configured to provide a wide range of services to members of virtual gaming communities. For example, the community server 280 may allow players to:

Create Social Networks—When creating social networks, members can create electronic associations that inform network members when selected members are: 1) online, 2) performing activities, 3) reaching milestones, 4) etc.

Establish a Reputation—Community members can establish reputations based on feedback from other community members, based on accomplishments in the community, based on who is in their social network, etc.

Provide Content—Community members can provide content by uploading media, designing wagering games, maintaining blogs, etc.

Filter Content—Community members can filter content by rating content, commenting on content, or otherwise distinguishing content.

Interact with Other Members—Community members can interact via newsgroups, chat, e-mail, discussion boards, instant messaging, etc.

Participate in Community Activities—Community members can participate in community activities, such as multi-player games, interactive meetings, discussion groups, real-life meetings, etc.

Connect Casino Players to Online Members—Community members who are playing in casinos can interact with members who are online. For example, online members may be able to: see activities of social contacts in the casino, chat with casino players, participate in community games involving casino players, etc.

In some embodiments, the community server 280 enables online community members (e.g., operating a personal computer (PC) or a mobile device) to participate in and/or monitor wagering games that are being presented in one or more casinos. The community server 280 can enable community members to connect with and track each other. For example, the community server 280 can enable community members to select other members to be part of a social network. The community server 280 can also enable members of a social network to track what other social network members are doing in a virtual gaming community and a real-world casino. For example, in some implementations, the community server 280 assists in enabling members of a social network to see when network members are playing wagering game tables and machines in a casino, accessing a virtual gaming community web site, achieving milestones (e.g., winning large wagers in a casino), etc.

The community server 280 can store and manage content for a virtual gaming community. For example, in some embodiments, the community server 280 can host a web site for a virtual gaming community. Additionally, the community server 280 can enable community members and administrators to add, delete, and/or modify content for virtual gaming communities. For example, the community server 280 can enable community members to post media files, member-designed games, commentaries, etc., all for consumption by members of a virtual gaming community.

The community server 280 can track behavior and gaming activity of community members. In some embodiments, the community server 280 tracks how individuals and/or groups use the services and content available in a virtual gaming community. The community server 280 can then report the gaming activity of each player to the wagering game server 250 and/or the account server 270. The community server 280 can analyze member behavior and categorize community members based on their behavior. The community server 280 can configure network components to customize content based on individual habits and/or group habits.

The wagering game machines 260 are configured to present wagering games and receive and transmit information (e.g., to/from the wagering game server 250) to control the content that is presented for the wagering games. The wagering game machines 260 can include input devices 262, a game management unit 264, a promotion coordination unit 265, a content store 266, and a presentation unit 268. The input devices 262 may include buttons, joysticks, touch screens, cameras, etc., used to detect player input associated with wagering games. The content store 266 is configured to store content that is presented on the wagering game machine 260. The presentation unit 268 is configured to control the presentation of the game content (and other game-related content) on the wagering game machine 260. The presentation unit 268 can include one or more browsers and any other software and/or hardware suitable for presenting audio and video content. It is noted, however, that in other implementations the game content can be presented using other display technologies.

The game management unit 264 is configured to manage and control the game content and the game events associated with the wagering games (and other game-related content) that are presented on the wagering game machine 260. The game management unit 264 can also track a player's gaming activity during a wagering game session, and provide player gaming activity data to the wagering game controller 210 for account management and/or player tracking purposes. The player gaming activity data for a wagering game session can indicate the type(s) of game(s) being played (e.g., slots, video poker, etc.), theme(s) of the games being played (e.g., movie theme, wild west theme, space theme, etc.), total amount wagered, total amount won/lost, total number of games played, the number of max bets, etc. during the wagering game session. Furthermore, the game management unit 264 can generate game results based on random numbers received from the wagering game server 250, or may communicate with the wagering game server 250 to obtain the game results.

The promotion coordination unit 265 is configured to monitors gaming-related events at the wagering game machine 260 to detect promotion trigger events. Promotion trigger events can be predefined gaming-related events that can be detected in the wagering game machine 260, which can indicate opportunities to present promotional content at the wagering game machine 260. When a promotion trigger event is detected, the promotion coordination unit 265 can provide a trigger notification message including information associated the promotion trigger event, the wagering game machine 260 and the corresponding player account (if applicable) to the promotional content server 275 to coordinate and customize the presentation of promotional content at the wagering game machine 260, as described herein with reference to FIGS. 1 and 3-5. In response to receiving the promotional content from the promotional content server 275, the promotion coordination unit 265 is configured to work in conjunction with the presentation unit 268 and the game management unit 264 to present the promotional content at the wagering game machine 260.

The promotional content server 275 is configured to select promotional content to present at the wagering game machines 260. The promotional content server 275 comprises a promotional content store 278 configured to store promotional content (e.g., advertisements, special offers, special events, giveaways, etc.) that can be presented across the wagering game machines 260 of the wagering game system 200. For example, the promotional content can be media presentations of advertisements from advertisement partners, or media presentations of special offers/events from the gaming establishment (e.g., casino). The promotional content server 275 also comprises a promotional content selection unit 277 configured to select the promotional content to send to a wagering game machine 260 for presentation at the wagering game machine 260 based on information included in a trigger notification message received from the wagering game machine 260, as described herein with reference to FIGS. 1 and 3-5.

The wagering game machines described herein (e.g., wagering game machines 260) can take any suitable form, such as floor standing models, handheld mobile units, multi-player electronic table models, bar-top models, workstation-type console models, surface computing machines, etc., and can access a communication network 255 to communication with the wagering game controller 210 via a wireless or wired connection. Further, wagering game machines can be primarily dedicated for use in conducting wagering games, or can include non-dedicated devices, such as personal computers (PC), mobile phones, personal digital assistants (PDAs), laptop computers, etc. For example, the non-dedicated devices can provide players access to wagering games via a wireless network within a physical casino, or remotely via the Internet.

In some embodiments, each of the wagering game machines 260 and the wagering game server 250 are configured to work together such that the wagering game machine 260 can be operated as a thin, thick, or intermediate client. For example, one or more elements of game play may be controlled by the wagering game machine 260 (client) or the wagering game server 250 (server). Game play elements can include executable game code, lookup tables, configuration files, game results, audio or visual representations of the game, game assets or the like. In a thin-client example, the wagering game server 250 can perform functions such as determining game results or managing assets, while the wagering game machine 260 can present an audible/graphical representation of such outcome or asset modification to the players. In a thick-client example, the wagering game machine 260 can determine game outcomes and communicate the outcomes to the wagering game server 250 for recording or managing a player's wagering game system account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, software or firmware updates, system quality or security checks, etc.

Each component shown in the wagering game system architecture 200 is shown as a separate and distinct element connected via the communications network 255. However, some functions performed by one component could be performed by other components. For example, the wagering game server 250 can be configured to perform some or all of the functions of the account server 270. Furthermore, the components shown may all be contained in one device, but some, or all, may be included in, or performed by multiple devices, as in the configurations shown in FIG. 2 or other configurations not shown, e.g., the promotion coordination unit 265 can be distributed across the wagering game server 250 and the wagering game machines 260. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions (e.g., executable by one or more processors) for performing the operations described herein. Machine-readable media includes any mechanism that provides (i.e., stores and/or transmits) information in a form readable by a machine (e.g., a wagering game table, machine, computer, etc.). For example, tangible machine-readable storage media includes read only memory (ROM), random access memory (RAM), magnetic disk storage media, optical storage media, flash memory machines, and other types of tangible medium suitable for storing instructions. Machine-readable transmission media includes any media suitable for transmitting software over a network.

Although FIG. 2 describes some embodiments, the following sections describe many other features and embodiments.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
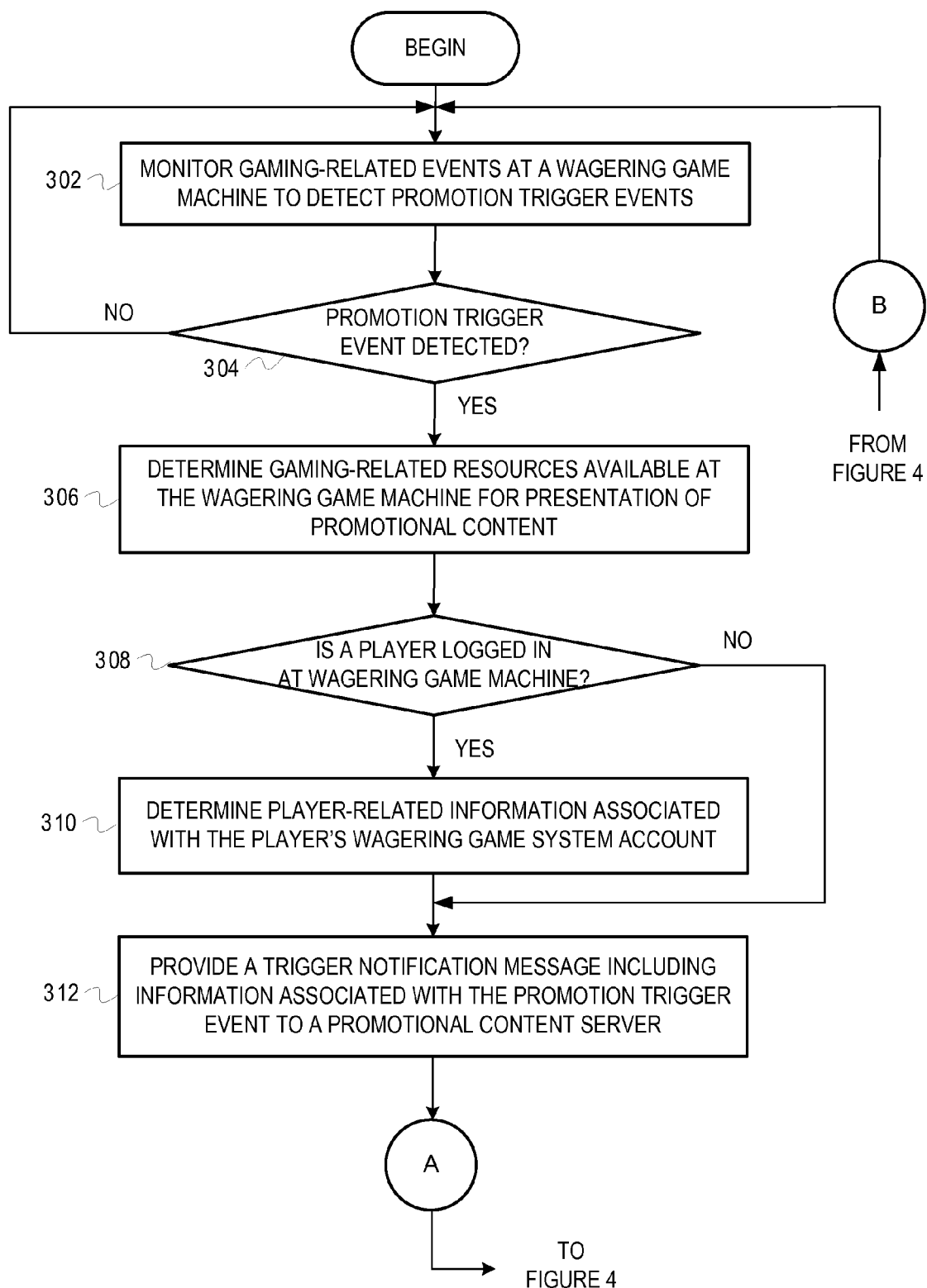
FIG. 3 is a flow diagram illustrating operations for coordinating and customizing a presentation of promotional content in a wagering game machine of a wagering game system, according to some embodiments.
Figure 4:
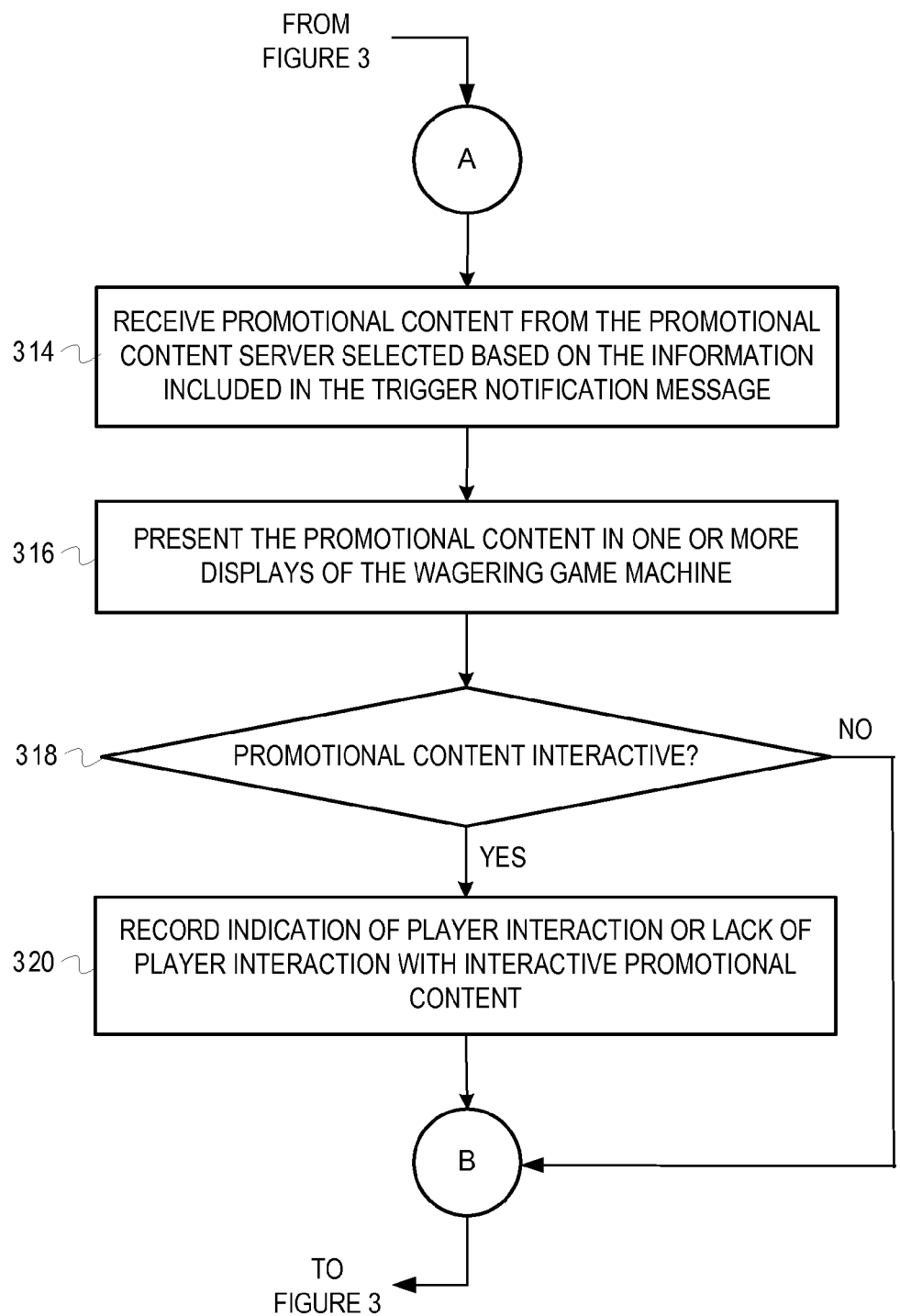
FIG. 4 is a flow diagram illustrating additional example operations for coordinating and customizing a presentation of promotional content in a wagering game machine of a wagering game system, according to some embodiments.
Figure 5:
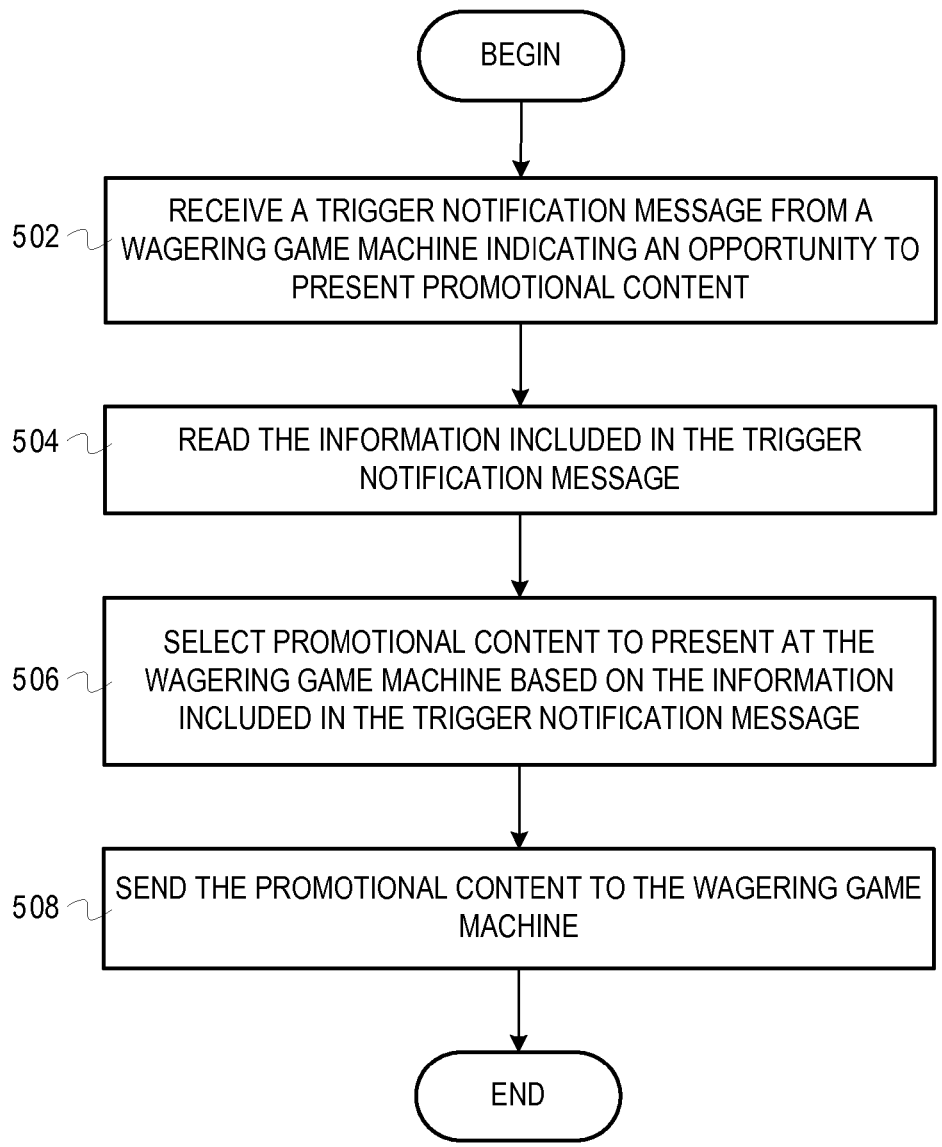
FIG. 5 is a flow diagram illustrating operations for selecting promotional content to send for presentation at a wagering game machine of a wagering game system, according to some embodiments.

The following discussion of FIGS. 3-5 describes example operations for presenting promotional content in wagering game machines of a wagering game system.

FIG. 3 is a flow diagram ("flow") 300 illustrating operations for coordinating and customizing a presentation of promotional content in a wagering game machine of a wagering game system, according to some embodiments. The flow of 300 will be described with reference to the example system architecture of FIG. 2. The flow diagram begins at block 302.

At block 302, the wagering game machine 260 monitors gaming-related events at the wagering game machine 260 to detect promotion trigger events. In some embodiments, the promotion coordination unit 265 of the wagering game machine 260 monitors the gaming-related events to detect promotion trigger events at the wagering game machine 260. For example, the promotion coordination unit 265 can receive an indication of gaming-related events from the game management unit 264 and/or the input devices 262. In another example, the promotion coordination unit 265 can intercept or snoop the communications to/from the game management unit 264 and/or the input devices 262 to monitor the gaming-related events. It is noted, however, that in other implementations the promotion coordination unit 265 can monitor the gaming-related events in the wagering game machine 260 by other methods; for example, the promotion coordination unit 265 can read activity or status bits in a register (and/or communicate with other gaming-related components/modules). As described above, in some implementations, gaming-related events can include all gaming activity, machine activity, and player activity associated with the wagering game machine 260. Promotion trigger events may be a subset of the gaming-related activity that are predefined as promotion trigger event to indicate opportunities to present promotional content at the wagering game machine 260. In some examples, the promotion trigger events can be predefined within the wagering game system 200 by the system operator, gaming-related partners (e.g., game manufacturers), and/or promotional content partners (e.g., third party promotional content provider/manager). Promotion trigger events may include player login/logout, an idle machine status, an idle period of time between rounds of a wagering game, big wins/losses, a player accessing other amenities offered at wagering game machine (e.g., game information, chat, Internet, virtual gaming community, etc.), presentation of predefined game content (e.g., bonus games, game results, etc.), an attract mode presentation at the machine, and other predefined gaming-related events. After block 302, the flow continues at block 304.

At block 304, the wagering game machine 260 determines whether a promotion trigger event is detected at the wagering game machine 160. In some embodiments, the promotion coordination unit 265 determines whether at least one of the detected gaming-related events is one of the predefined promotion trigger events. If the promotion coordination unit 265 does not detect a promotion trigger event, the flow loops back to block 302, where the promotion coordination unit 265 continues to monitor the gaming-related events at the wagering game machine 260. If the promotion coordination unit 265 detects a promotion trigger event, the flow continues at bock 306.

At block 306, the wagering game machine 260 determines gaming-related resources that are available at the wagering game machine 260 for presentation of promotional content. In some embodiments, the promotion coordination unit 265 determines the gaming-related resources that are available for presentation of promotional content. For example, the gaming-related resources may include the number of displays that are available for presenting promotional content (e.g., main and top displays), the type of hardware/software that is available for presenting promotional content (e.g., touchscreen displays, web browsers with Adobe® Flash® capabilities, 3D displays, etc.), the lighting options available for promotional content, the audio options available for promotional content, and other interactive input devices available for promotional content (e.g., interactive chair, camera with machine vision, etc.). In one implementation, the promotion coordination unit 265 can determine the gaming-related resources available at the wagering game machine 260 from the game management unit 264 (or from one or more related configuration registers). It is noted, however, that in other implementations the promotion coordination unit 265 can determine the gaming-related resources by additional methods/techniques, such as detecting the input devices 262 (e.g., the corresponding device drivers) of the wagering game machine 260. After block 306, the flow continues at block 308.

At block 308, the wagering game machine 260 determines whether a player is logged in at the wagering game machine 260. In some embodiments, the promotion coordination unit 265 determines whether the wagering game machine 260 is idle, or whether a wagering game session has been initiated for a player that logged in at the wagering game machine 260. For example, the promotion coordination unit 265 can communicate with the game management unit 264 to determine if a player is logged in at the wagering game machine 260. If the promotion coordination unit 265 determines that the wagering game machine 260 is idle, the flow continues at block 312. If the promotion coordination unit 265 determines that a player is logged in at the wagering game machine 260, the flow continues at bock 310.

At block 310, if a player is logged in at the wagering game machine 260, the wagering game machine 260 determines player-related information associated with the player's wagering game system account ("player account"). In some embodiments, the promotion coordination unit 265 determines player-related information associated with the player account, such as player demographic data or player gaming activity data. In one implementation, the promotion coordination unit 265 can determine the player gaming activity data associated with the current wagering game session from the game management unit 264 and/or the game management unit 252. The promotion coordination unit 265 can determine the player demographic data from the player card and/or by accessing the player account at the account server 270. The promotion coordination unit 265 can also determine historical player gaming activity data from the player account at the account server 270. As described above, in some examples, the player demographic data can indicate the gender and approximate age of the player. The player gaming activity data can indicate player gaming activity associated with the current wagering game session, such as the type(s) of game(s) currently being played (e.g., slots, video poker, etc.), theme(s) of the games currently being played (e.g., movie theme, wild west theme, space theme, etc.), total amount wagered, total amount won/lost, total number of games played, the number of max bets, and other indicators of the player's participation, performance, and/or achievements. The player activity data can also indicate historically player activity data associated with the player account of the player that is logged in at the wagering game machine 260. The historical player activity data can indicate information about the player activity since the account was opened, such as the type(s) of games played (e.g., slots, video poker, etc.), theme(s) of the games played (e.g., movie theme, wild west theme, space theme, etc.), total amount wagered, total amount won/lost, highest won amount, total number of games played, the number of max bets, how frequent the player visits the gaming establishment, and other indicators of the player's historical participation, performance, and/or achievements. After block 310, the flow continues at block 312.

At block 312, the wagering game machine 260 provides a trigger notification message including information associated with the promotion trigger event to the promotional content server 275. In some embodiments, the promotion coordination unit 265 provides the trigger notification message to the promotional content server 275. In one implementation, the trigger notification message includes an indication of the type of promotion trigger event that was detected, and also may include an indication of the gaming-related resources that are available at the wagering game machine 260 and/or player-related information associated with the corresponding player account (if a player is logged in). This information may also include a timestamp or other indication of date, day of the week, and time of day. The trigger notification message can help coordinate the timing of the presentation of the promotional content at the wagering game machine 260 with the occurrence of the promotion trigger event. This can help prevent the presentation of the promotional content from interrupting gaming activity, gaming content, and other critical gaming-related content. Furthermore, the information in the trigger notification message can help customize the promotional content that is presented at the wagering game machine 260. After block 312, the flow continues at block 314 of FIG. 4.

FIG. 4 is a flow diagram illustrating additional example operations for coordinating and customizing a presentation of promotional content in a wagering game machine of a wagering game system, according to some embodiments. The flow diagram of FIG. 4 is a continuation of the flow diagram shown in FIG. 3, and begins at block 314.

At block 314, the wagering game machine 260 receives promotional content from the promotional content server 275 selected based on the information included in the trigger notification message. In some embodiments, the promotion coordination unit 265 receives the promotional content from the promotional content server 275. As described above, in some embodiments, the promotional content server 275 selects the promotional content to send for presentation at the wagering game machine 260 based on the information included in the trigger notification message (that was received from the wagering game machine 260), as will be further described below with reference to FIG. 5. After block 314, the flow continues at block 316.

At block 316, the wagering game machine 260 presents the promotional content in one or more displays of the wagering game machine 260. In some embodiments, the promotion coordination unit 265 can work in conjunction with the game management unit 264 and the presentation unit 268 to present the promotional content in one or more displays of the wagering game machine 260. In some cases, the promotion coordination unit 265 can also work in conjunction with the game management unit 264 and the presentation unit 268 to utilize one or more of the additional gaming-related resources that are available at the wagering game machine 260 for the presentation of the promotional content (e.g., 3d display, touchscreen display, cabinet lighting, etc.). In some embodiments, the promotion coordination unit 265 can determine which gaming-related resources of the wagering game machine 260 to utilize for presenting the promotional content based on the type of media received from the promotional content server 275 and/or based on other control information received from the promotional content server 275 (e.g., message header information or other message field information). In some implementations, the promotion coordination unit 265 can present the promotional content immediately after reception. For example, the promotion coordination unit 265 can determine whether the promotion trigger event condition still exists after reception of the promotional content. In one example, the promotion coordination unit 265 can determine whether the machine is still idle. In another example, the promotion coordination unit 265 can determine whether the player is still accessing other services/amenities offered at the wagering game machine 260 (e.g., game information, chat, Internet, virtual gaming community, etc.). If the promotional trigger event condition still exists after reception, the promotion coordination unit 265 presents the promotional content in one or more displays of the wagering game machine 260. Otherwise, the promotion coordination unit 265 can temporarily store (e.g., cache) and delay the presentation of the promotional content until the next promotional opportunity is detected. In some examples, even if the promotion trigger event condition has passed, the promotion coordination unit 265 can initiate the presentation of the promotional content immediately after reception as long as it does not disrupt gaming activity, gaming content, etc.

At block 318, the wagering game machine 260 determines if the promotional content that is presented is interactive promotional content. For example, the promotion coordination unit 265 can determine whether the promotional content that is presented is interactive (e.g., the media presentation requests that the player interact with the touchscreen, buttons, or other input devices for making selections). For example, the promotional content presented may request that the player select one of two special offers, or request that the player click on a web link to the advertiser's website to redeem a web coupon (e.g., via the touchscreen display). If the promotion coordination unit 265 determines the promotional content is interactive, the flow continues at block 320. If the promotion coordination unit 265 determines that the promotional content is not interactive, the flow loops back to block 302 of FIG. 3, where the promotion coordination unit 265 continues to monitor the gaming-related events at the wagering game machine 260 to detect promotion trigger events.

At block 320, the wagering game machine 260 records an indication of player interaction or lack of player interaction with the interactive promotional content. For example, the promotion coordination unit 265 determines whether player input is received that indicates the player interacted with the interactive promotional content that was presented at the wagering game machine 260. The promotion coordination unit 265 can also determine the type of interaction. For example, the promotion coordination unit 265 can determine whether the player input indicates the player selected one of the choices of special offers presented, the player followed a web link, etc. The promotion coordination unit 265 can record the player interaction or lack of player interaction. The promotion coordination unit 265 can provide this recorded player interaction information to the account server 270 and/or to the promotional content server 275 to store player preferences with respect to promotional content, which can be used in the future as another criteria for selecting promotional content. The recorded information can also be used to track the effectiveness of the selection of promotional content (based on the trigger notification message information), track the effectiveness of the actual promotional content, etc. After block 320, the flow loops back to block 302 of FIG. 3, where the promotion coordination unit 265 continues to monitor the gaming-related events at the wagering game machine 260 to detect promotion trigger events.

FIG. 5 is a flow diagram 500 illustrating operations for selecting promotional content to send for presentation at a wagering game machine of a wagering game system, according to some embodiments. The flow of 500 will be described with reference to the example system architecture of FIG. 2. The flow diagram begins at block 502.

At block 502, the promotional content server 275 receives a trigger notification message from a wagering game machine 260 indicating an opportunity to present promotional content at the wagering game machine 260. As described above, the wagering game machine 260 can detect a promotion trigger event that indicates an opportunity to present promotional content. The trigger notification message can include an indication of the type of promotion trigger event that was detected, and also may include an indication of the gaming-related resources that are available at the wagering game machine 260 to present promotional content and/or player-related information (if a player is logged in), as was described above with reference to FIGS. 1-4. In one implementation, the promotional content server 275 can be implemented (e.g., run, updated, serviced, etc.) within the wagering game system 200 by the operator of the gaming establishment (e.g., the casino operator). In another implementation, the promotional content server 275 can be implemented (e.g., run, updated, serviced, etc.) within the wagering game system 200 by a third-party promotional content provider. It is noted, however, that in other implementations the promotional content server 275 can be implemented in various ways; for example, the functionality of the promotional content server 275 can be distributed between a server within the system 200 and a server external to the system 200. For example, the server external to the system 200 can be located in another network/facility external to the gaming establishment (e.g., accessible via the Internet), such as a business facility of the third party promotional provider. After block 502, the flow continues at block 504.

At block 504, the promotional content selection unit 277 of the promotional content server 275 can read the information included in the trigger notification message. For example, the promotional content selection unit 277 can read the type of promotion trigger event, the gaming-related resources that are available at the wagering game machine 260, and the player-related information (if included). After block 504, the flow continues at block 506.

At block 506, the promotional content selection unit 277 can select the promotional content to present at the wagering game machine 160 based on the information included in the trigger notification message. In some embodiments, the promotional content selection unit 277 may identify and select promotional content that may be relevant to the player and/or detected trigger event from a plurality of available promotional content (e.g., stored in the promotional content store 278 of the promotional content server 275) based on the information included in the trigger notification message. For example, the trigger notification message can indicate an idle time period in between rounds of a wagering game with a movie theme, can indicate the player has been playing the game for two hours, can indicate that historically the player prefers games with movie or television show themes, and can indicate that the wagering game machine 260 has touchscreen and 3D display capabilities in the main display. Based on this information, the promotional content selection unit 277 can determine whether it has any available promotional content in 3D and/or that utilizes touchscreen capabilities for upcoming or new movie releases. In this example, the promotional content selection unit 277 can select media of a movie preview in 3D for a movie that has recently been released to theaters. The movie preview may also include an embedded link to a website where the player can buy tickets to the movie at any point during or after the media presentation. In another example, the trigger notification message can indicate a player logout with a loss of $250 during the wagering game session, indicate that the player has visited the casino at least once a year for the last 8 years, indicate that the player has attended a show offered in the casino each visit, and indicate that the wagering game machine 260 has touchscreen capabilities in the main display. Based on this information, the promotional content selection unit 277 can determine (e.g., based on information provided by the casino operator to the promotional content server 275 regarding last-minute offers/giveaways that are available that day) that two theater shows scheduled for that day are only 20-30% booked. The promotional content selection unit 277 can select a promotional media presentation that offers the player two free show tickets to one of the two available shows (e.g., with a face value of $200). For example, the promotional presentation can display information about the two shows in the main display of the wagering game machine 260 and allow the player to select one of the two shows via the touchscreen to obtain the two free show tickets (e.g., either e-tickets or print tickets). In other words, the promotional content selection unit 277 can select the promotional content to present at the wagering game machine 260 based on any combination of the information included in the trigger notification message to help ensure that the selected promotional content is relevant to the player and/or detected trigger event. After block 506, the flow continues at block 508.

At block 508, the promotional content selection unit 277 sends the selected promotional content to the wagering game machine 260. For example, promotional content selection unit 277 can send one or more messages including media files (e.g., audio/video files) and other information necessary to present the promotional content at the wagering game machine 260. After block 508, the flow ends.

It should be understood that the depicted diagrams are examples meant to aid in understanding embodiments and should not be used to limit embodiments or limit scope of the claims. Embodiments may perform additional operations, fewer operations, operations in a different order, operations in parallel, and some operations differently. For example, in some implementations, when the wagering game machine 260 sends the trigger notification message after detecting a player login, the promotional content server 275 can select one or more media presentations of promotional content based on the information included within the trigger notification message. The wagering game machine 260 can receive and temporarily store (e.g., cache) the one or more media presentations of promotional content. The wagering game machine 260 can be configured to store and therefore delay presenting the promotional content, because presenting promotional content after player login may disrupt (or delay) game play and potentially disturb the player. After storing the promotional content, the wagering game machine 260 may continue to monitor gaming-related activity to detect subsequent promotion trigger events. In one implementation, in response to detecting a subsequent promotional trigger event, the wagering game machine 260 can present the promotional content that was temporarily stored. If more than one media presentation of promotional content was temporarily stored, the wagering game machine 260 can select at least a subset of the media presentations and present the subset of the media presentations (or all the media presentations). Since the promotional content is already stored in the wagering game machine 260, the promotional content can be presented at the wagering game machine 260 immediately after detecting the subsequent promotion trigger event. In another implementation, in response to detecting the subsequent promotion trigger event, the wagering game machine 260 can still send a trigger notification message to the promotional content server 275. The promotional content server 275 can either send a response message indicating to present one or more of the media presentations already stored at the wagering game machine 260, or can send additional promotional content (e.g., selected based on the information included in the subsequent trigger notification message) to the wagering game machine 260. The wagering game machine 260 can then present one or more of the media presentations that are stored in the wagering game machine 260, and/or present the new promotional content included in the response message.

In some embodiments, the trigger notification message that is sent by the wagering game machine 260 to the promotional content server 275 can also indicate that the wagering game machine 260 is part of a bank of related wagering game machines that includes a common overhead display (and other information about the bank) that may be used to present promotional content. In one implementation, the promotional content server 275 can determine that the common overhead display is also available to be used to present promotional content when the server 275 receives a trigger notification message from all the wagering game machines in the bank. In another implementation, the promotional content server 275 can determine that the common overhead display may be available to be used to present promotional content when the server 275 receives a trigger notification message from at least one of the wagering game machines in the bank (and the wagering game machine can make the determination of whether to also display the content in the common overhead display if not presenting critical content). Furthermore, the trigger notification message sent by the wagering game machine 260 can also indicate that the bank of wagering game machines is fully occupied by players. In another implementation, in addition to a bank of related wagering game machines, the trigger notification message can also indicate when the wagering game machine 260 is an electronic table (e-table) with a common tabletop display and/or one or more common overhead displays, or a discrete wagering game machine 260 that is associated with one or more additional discrete wagering game machines 260 located across the casino floor (or other gaming venue). The promotional content server 275 can use this information to select promotional contests/offers that may be relevant to all the players at the bank of wagering game machines, or the electronic table, or the related discrete wagering game machines. For example, the promotional content server 275 can select a media presentation of a contest that randomly awards the player that is seated in one of the wagering game machines of the bank (or electronic table) a free buffet at one of the casino restaurants or free show tickets. In another example, the promotion coordination unit of the wagering game machine can detect that the other players seated at the electronic table or at the bank of wagering game machines (or at the plurality of discrete wagering game machines located across the casino floor) are friends, or are part of a group or convention, or have similar gaming preferences, demographics, or other interests (e.g., by accessing the account server 270 and/or the community server 280). In response to determining there is a common association or other similarities between the players, the wagering game machines or the electronic table can provide a mechanism for the players that are seated at the wagering game machines or the electronic table to vote on the promotional options that are presented or awarded. For example, the players can vote on which promotional advertisement out of three options should be presented. In another example, the players can vote which promotional giveaway out of three options should be given to the players. In one implementation, as the players cast their vote, the wagering game machines or the electronic table can show a tally of the promotional options that are receiving the most votes (or a tally of the votes for all the options), and the players can adjust their votes accordingly (e.g., in order to select one of the more popular promotional options, or decide a close race between two options).

Example Wagering Game Machines

This section describes example operating environments, systems and networks, and presents structural aspects of some embodiments.

Wagering Game Machine Architecture

Figure 6:
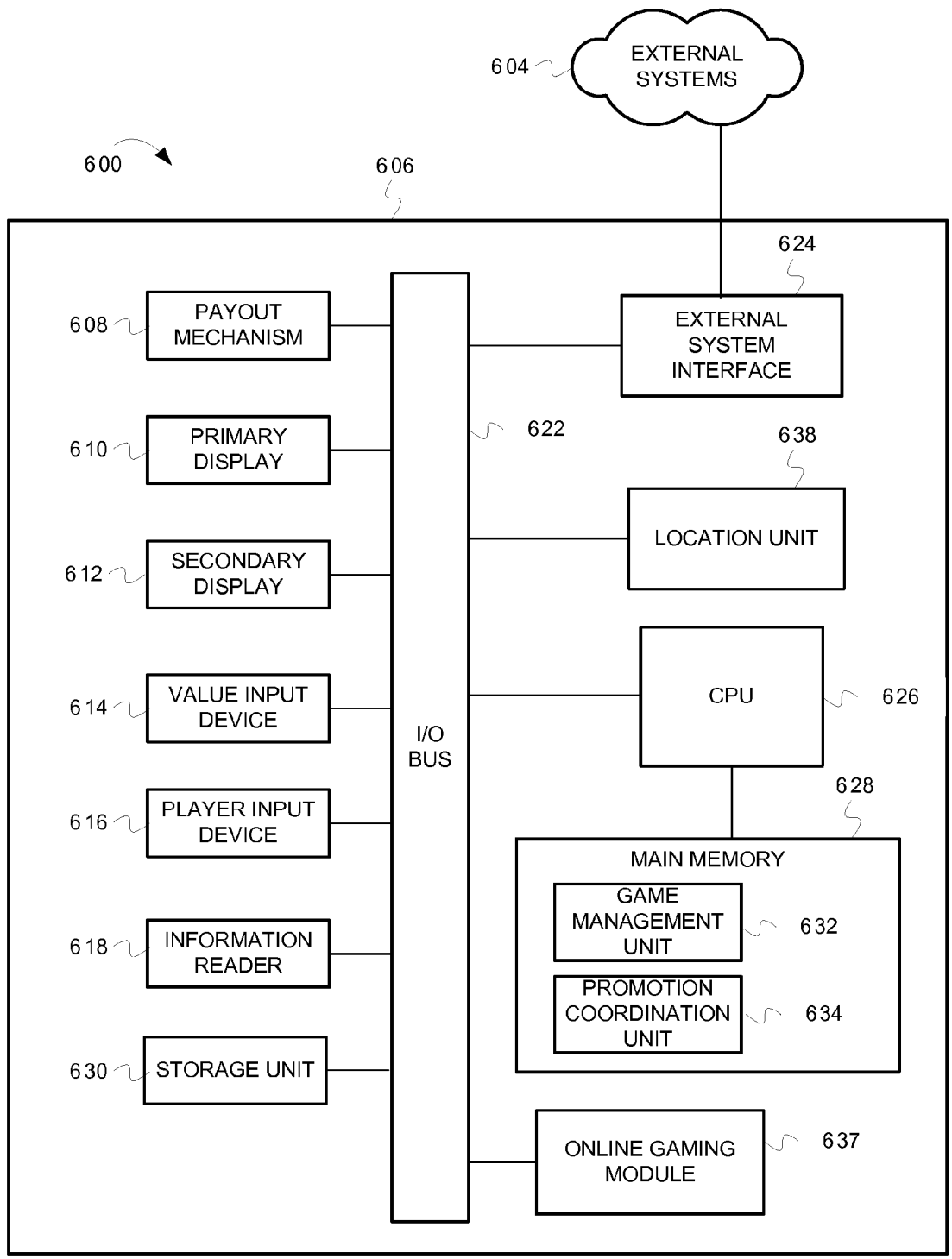
FIG. 6 is a conceptual diagram that illustrates an example of a wagering game machine architecture, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a game management unit 632 and a promotion coordination unit 634. In some embodiments, the game management unit 632 can present wagering games, such as video poker, video black jack, video slots, video lottery, reel slots, etc., in whole or part. The promotion coordination unit 634 can coordinate and customize presentations of promotional content at the wagering game machine 606, e.g., as described above with reference to FIGS. 1-5.

The CPU 626 is also connected to an input/output ("I/O") bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks). The external system interface 624 can include logic for exchanging information over wired and wireless networks (e.g., 802.11g transceiver, Bluetooth® transceiver, Ethernet transceiver, etc.).

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

In some embodiments, the wagering game machine 606 includes an online gaming module 637. The online gaming module 637 can process communications, commands, or other information, where the processing can control and present online wagering games. In some embodiments, the online gaming module 637 can work in concert with the game management unit 632, and can perform any of the operations described above.

Furthermore, any component of the wagering game machine 606 can include hardware, firmware, and/or machine-readable media including instructions for performing the operations described herein.

Example Wagering Game Machines

Figure 7:
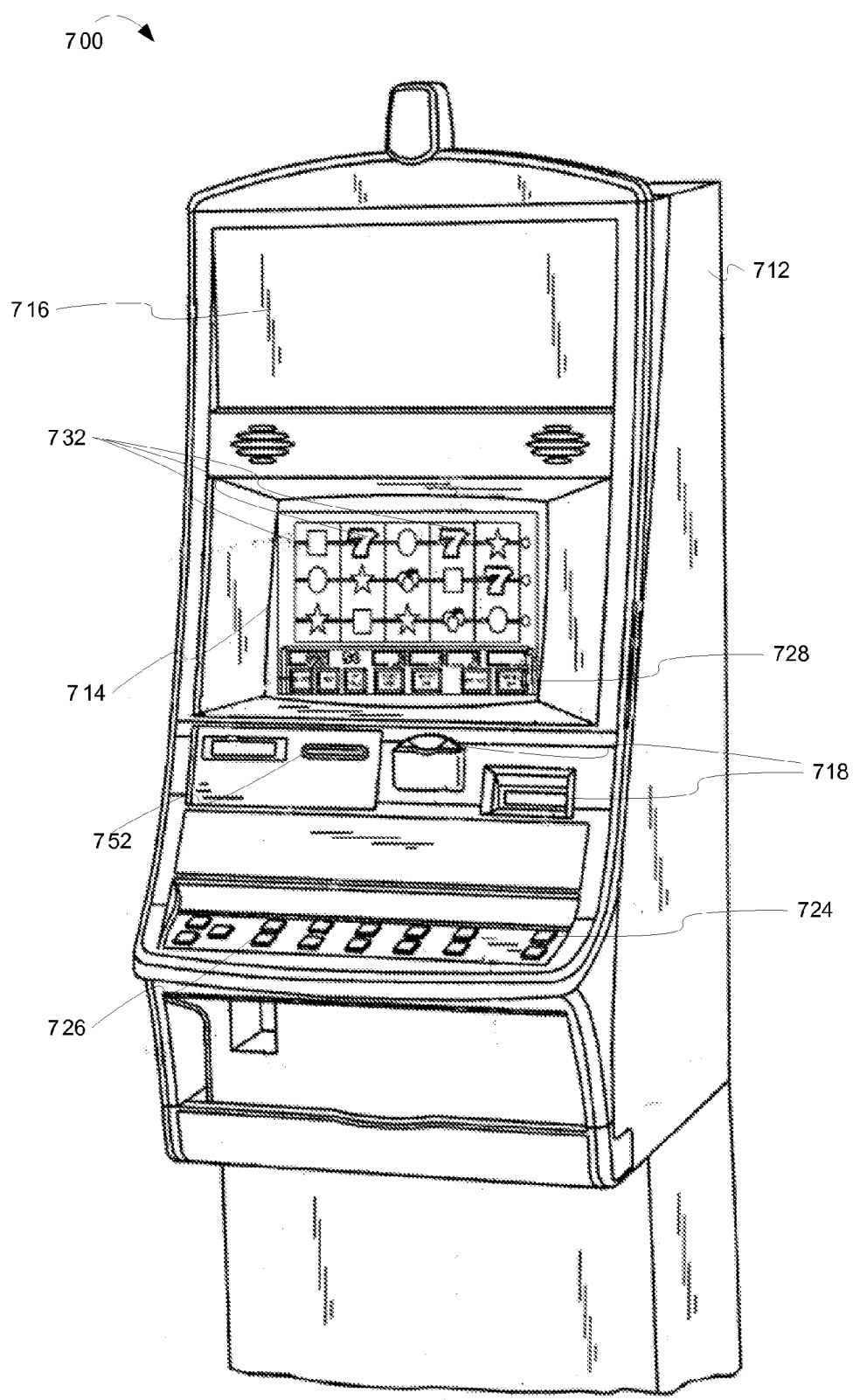
FIG. 7 is a perspective view of a wagering game machine, according to example embodiments.

FIG. 7 is a perspective view of a wagering game machine, according to example embodiments. Referring to FIG. 7, a wagering game machine 700 is used in gaming establishments, such as casinos. In some embodiments, the wagering game machine 700 can implement some of the functionality described above for coordinating and customizing presentations of promotional content at the wagering game machine 700, e.g., as described above with reference to FIGS. 1-6.

According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. In some implementations, the primary display 714 can also display information about a bonus wagering game and a progressive wagering game. The wagering game machine 700 also includes a secondary display 716 for displaying bonus wagering games, wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for disseminating promotion content in a wagering game network, the method comprising:
   detecting, by a wagering game machine via at least one of the one or more electronic input devices, a physical item associated with a monetary value that establishes a credit balance;
   initiating, by the wagering game machine, a wagering game in response to an input indicative of a wager covered by the credit balance;
   detecting, by the wagering game machine, a promotion trigger event associated with the wagering game;
   transmitting, by the wagering game machine to a promotion content server, an indication of the promotion trigger event and of media presentation resources of the wagering game machine;
   selecting, by the promotional content server, promotional content based on the promotion trigger event and the media presentation resources of the wagering game machine, wherein the promotional content includes a promotion for one or more casino amenities;
   transmitting, via a communications network, the promotional content to the wagering game machine;
   presenting, by the wagering game machine, the promotional content using one or more of the media presentation resources; and
   receiving, via at least one of the one or more electronic input devices, a cashout input that initiates a payout from the credit balance.

2. The method of claim 1, wherein the indication of the promotion trigger event comprises information included in a player account associated with a player of the wagering game.

3. The method of claim 2, wherein the information included in a player account associated with a player of the wagering game comprises at least one of player demographic information, player gaming activity data associated with a wagering game session, or historical player gaming activity.

4. The method of claim 1, wherein the promotion trigger event is one of player logout request, idle status of the wagering game machine after the wagering game, idle period between rounds of the wagering game, or player use of services via the wagering game machine.

5. The method of claim 1, wherein the indication of the media presentation resources of the wagering game machine indicates at least one of a number of display devices of the wagering game machine, type of hardware and software available for presenting promotional content, wagering game machine lighting resources, wagering game machine audio resources, or wagering game machine interactive resources.

6. The method of claim 1, wherein the indication of the promotion trigger event comprises at least one of an indication of a player login, a player logout, an idle machine status, an idle period of time between rounds of the wagering game, a win that exceeds a threshold amount, a loss that exceeds a threshold amount, a player accessing other services offered at the wagering game machine, a presentation of a bonus game, or a presentation of predefined game content.

7. The method of claim 1, wherein the one or more casino amenities include one of an advertisement, ticket offer, restaurant item, or hotel offer.

8. One or more machine-readable storage media, having instructions stored therein, which when executed by one or more processors causes the one or more processors to perform operations for distributing promotion content in a wagering game system, the instructions comprising:
   instructions to detect, by a wagering game machine via at least one of the one or more electronic input devices, a physical item associated with a monetary value that establishes a credit balance;
   instructions to initiate, by the wagering game machine, a wagering game in response to an input indicative of a wager covered by the credit balance;
   instructions to detect, by the wagering game machine, a promotion trigger event associated with the wagering game;
   instructions to transmit, by the wagering game machine to a promotion content server, an indication of the promotion trigger event and of media resources of the wagering game machine;
   instructions to select promotional content based on the indication of the promotion trigger event and of the media resources of the wagering game machine, wherein the promotional content includes a promotion associated with one or more casino amenities; and
   instructions to transmit, via a communications network, the promotional content to the wagering game machine;
   instructions to present, by the wagering game machine, the promotional content using one or more of the media resources; and
   instructions to receive, via at least one of the one or more electronic input devices, a cashout input that initiates a payout from the credit balance.

9. The one or more machine-readable storage media of claim 8, wherein the indication of the promotion trigger event includes at least one of a type of promotion trigger event, or information included in a player account associated with a player of the wagering game.

10. The one or more machine-readable storage media of claim 9, wherein the information included in a player account associated with a player of the wagering game comprises at least one of player demographic information, player gaming activity data associated with a wagering game session, or historical player gaming activity.

11. The one or more machine-readable storage media of claim 8, wherein the promotion trigger event is one of player logout request, idle status of the wagering game machine after the wagering game machine, idle period between rounds of the wagering game machine, or player use of services via the wagering game machine.

12. The one or more machine-readable storage media of claim 8, wherein the gaming-related resources of the wagering game machine comprise at least one of number of display devices of the wagering game machine, type of hardware and software available for presenting promotional content, wagering game machine lighting resources, wagering game machine audio resources, or wagering game machine interactive resources.

13. The one or more machine-readable storage media of claim 8, wherein the indication of the promotion trigger event comprises at least one of an indication of a player login, a player logout, an idle machine status, an idle period of time between rounds of the wagering game, a win that exceeds a threshold amount, a loss that exceeds a threshold amount, a player accessing other services offered at the wagering game machine, a presentation of a bonus game, or a presentation of predefined game content.

14. The one or more machine-readable storage media of claim 8, wherein the one or more casino amenities include at least one of an advertisement, special offer, ticket offer, restaurant item, or hotel offer.

15. A wagering game system comprising:
a wagering game machine including
one or more first processors;
one or more machine-readable mediums including instructions that, when executed by the first processors, cause the wagering game machine to perform operations for distributing offers, the instructions including
instructions to detect, via at least one of the one or more electronic input devices, a physical item associated with a monetary value that establishes a credit balance;
instructions to initiate a wagering game in response to an input indicative of a wager covered by the credit balance;
instructions to detect a promotion trigger event associated with the wagering game;
instructions to transmit, to a promotion content server via a network, an indication of the promotion trigger event and of media resources of the wagering game machine;
instructions to receive, via at least one of the one or more electronic input devices, a cashout input that initiates a payout from the credit balance
a promotional content server including
one or more second processors;
at least one machine-readable storage medium including
instructions, which when executed by the one or more second processors, cause the one or more processors to perform for distributing the offers, the instructions including
instructions to select promotional content based on the promotion trigger event and the media resources of the wagering game machine, wherein the promotional content includes a promotion associated with one or more casino amenities; and
instructions to transmit the promotional content to the wagering game machine.

16. The wagering game system of claim 15, wherein the instructions included in the wagering game machine further include instructions to receive the promotional content;
instructions to determine whether to present the promotional content;
instructions to, in response to a determination to present the promotional content after receiving the promotional content, present the promotional content via at least one of the media resources; and
instructions to, in response to determining not the present the promotional content after receiving the promotional content, store the promotional content at the wagering game machine.

17. The wagering game system of claim 15, wherein the instructions included in the wagering game machine further include instructions to monitor play of the wagering game;
instructions to detect occurrence of the promotion trigger event during play of the wagering game; and
instructions to transmit, to the promotional content server, the indication of the promotion trigger event.

18. The wagering game system of claim 15, further comprising a wagering game server comprising one or more computer-readable storage mediums including instructions that, when executed by the wagering game server, cause the wagering game server to perform operations for processing the promotional content, the instructions including:
instructions to receive, from the promotional content server, the promotional content;
instructions to a determine whether to present the promotional content;
instructions to, in response to a determination to present the promotional content after receipt of the promotional content, transmit, to the wagering game machine, the promotional content for presentation on the wagering game machine; and
instructions to, in response to a determination not to present the promotional content after receipt of the promotional content, store the promotional content at the wagering game server.

19. The wagering game system of claim 15, further comprising a wagering game server comprising one or more computer-readable storage mediums including instructions that, when executed by the wagering game server, cause the wagering game server to perform operations for processing a promotion trigger event, the instructions including:
instructions to monitor play of the wagering game;
instructions to detect occurrence of the promotion trigger event during play of the wagering game; and
instructions to transmit, to the promotional content server, the indication of the promotion trigger event.

20. The wagering game system of claim 15, wherein the media resources of the wagering game machine comprise at least one of a number of displays of the wagering game machine, type of hardware and software available for presenting promotional content, wagering game machine lighting resources, wagering game machine audio resources, or wagering game machine interactive resources.

* * * * *